(12) United States Patent
Joyner et al.

(10) Patent No.: US 8,238,758 B2
(45) Date of Patent: Aug. 7, 2012

(54) THREE-ARM DQPSK MODULATOR

(75) Inventors: Charles H. Joyner, Sunnyvale, CA (US); Scott Corzine, Sunnyvale, CA (US); Masaki Kato, Palo Alto, CA (US); Mehrdad Ziari, Pleasanton, CA (US)

(73) Assignee: Infinera Corporation, Sunnyvale, CA (US)

( * ) Notice: Subject to any disclaimer, the term of this patent is extended or adjusted under 35 U.S.C. 154(b) by 649 days.

(21) Appl. No.: 12/344,135

(22) Filed: Dec. 24, 2008

(65) Prior Publication Data

US 2009/0220235 A1   Sep. 3, 2009

Related U.S. Application Data

(60) Provisional application No. 61/030,738, filed on Feb. 22, 2008.

(51) Int. Cl.
*H04B 10/04* (2006.01)
(52) U.S. Cl. ......... 398/183; 398/198; 398/185; 398/186
(58) Field of Classification Search .................. 398/183, 398/185, 186, 187, 188, 198; 359/238, 245, 359/250, 254, 266, 271, 276, 278, 279
See application file for complete search history.

(56) References Cited

U.S. PATENT DOCUMENTS

| | | | |
|---|---|---|---|
| 6,393,166 B1 * | 5/2002 | Burns | 385/2 |
| 6,583,917 B2 * | 6/2003 | Melloni et al. | 359/245 |
| 6,798,557 B1 | 9/2004 | Leven | |
| 7,636,501 B2 * | 12/2009 | Doerr et al. | 385/3 |
| 2005/0286904 A1 | 12/2005 | Calabro et al. | |
| 2007/0269223 A1 | 11/2007 | Noguchi et al. | |

FOREIGN PATENT DOCUMENTS

WO    2004/005972 A2    1/2004

OTHER PUBLICATIONS

Doerr et al., "Compact High-Speed InP DQPSK Modulator", IEEE Photonics Technology Letters, Aug. 2007, pp. 1184-1186, vol. 19, No. 15.*
Cisneros, 'International Search Report,' Feb. 2009.
Cisneros, 'Written Opinion of the International Searching Authority,' Feb. 2008, European Patent Office, Munich.
Doerr et al., 'Compact High-Speed InP DQPSK Modulator,' IEEE Photonics Technology Letters, Aug. 2007, pp. 1184-1186, vol. 19, No. 15.
Kikuchi, 'Intersymbol Interference (ISI) Suppression Technique for Optical Binary and Multilevel Signal Generation,' Journal of Lightwave Technology, Aug. 2007, pp. 2060-2068, vol. 25, No. 8.
Doi et al., '40 Gb/s Low-drive-voltage LiNbO3 Optical Modulator for DQPSK Modulation Format,' Optical Society of America (OSA), Mar. 2007, OWH4.PDF.
Han, et al., 'Differential Polarization-Phase-Shift Keying without Using Polarization Control,' Optical Society of America (OSA) Mar. 2005, JWA39.
Gao, et al. 'Feasibility Study of a Simple 100Gb/s Transmitter with Low-speed Electronics and 0.8bit/sHz Spectral Efficiency,' pp. 412-414, Oct. 2007.

* cited by examiner

*Primary Examiner* — M. R. Sedighian
(74) *Attorney, Agent, or Firm* — David L. Soltz

(57) ABSTRACT

A modulator is disclosed that includes three arms between a splitter portion and a coupler portion. The modulator typically requires at most a π/2 phase shift between constellation points. Accordingly, the modulator is more efficient and consumes less power.

18 Claims, 6 Drawing Sheets

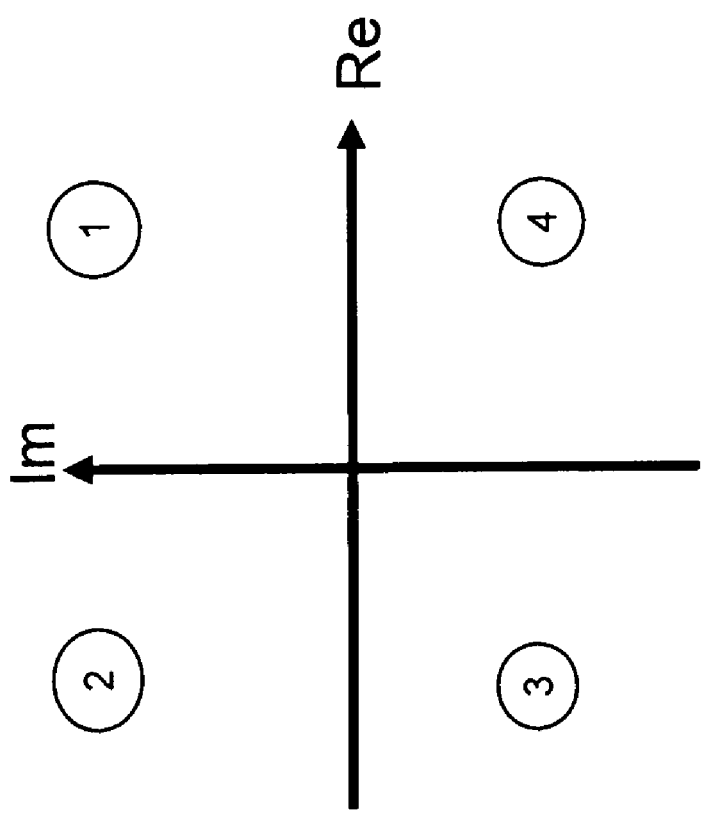

THREE-ARM DQPSK MODULATOR

RELATED APPLICATION

This application claims priority to U.S. Provisional Patent Application No. 61/030,738, filed Feb. 22, 2008, the disclosure of which is incorporated by reference herein in its entirety.

BACKGROUND

Various transmission formats have been explored in order to increase the capacity of fiber optical communication systems. One such format is Differential Quadrature Phase Shift Keying (DQPSK), in which data is encoded as a difference in phase of a transmitted optical signal.

FIG. 1 illustrates a conventional DQPSK modulator. Modulator 100 includes a laser 110, which may be a distributed feedback (DFB) semiconductor laser operating in a continuous wave (CW) mode and at a particular wavelength. Light output from laser 110 is supplied to a splitter 112, which provides substantially half the received light to inner Mach-Zehnder (MZ) modulator 114 and half the light to inner MZ modulator 116. Inner MZ modulator 114 includes first and second arms 112-*a* and 112-*b*, each of which being coupled to corresponding electrodes 112-*c* and 112-*d*. Inner MZ modulator 116 includes first and second arms 112-*e* and 112-*f* coupled to corresponding electrodes 112-*g* and 112-*h*.

As further shown in FIG. 1, precoder circuits 116 and 118 are provided which receive data streams DATA1 and DATA2, respectively. Precoder circuit 116 outputs in-phase signal I and its complement I(bar) and precoder circuit 118 outputs quadrature signal Q and its complement Q(bar). I, I(bar), Q, and Q(bar) are supplied to electrodes 112-*c*, 112-*d*, 112-*g*, and 112-*h*, respectively. Light passing through arms 112-*g* and 112-*h* is combined and the polarization of the combined light is rotated by $\pi/2$ (see rotator 118). The rotated light is then combined with light output from arms 112-*a* and 112-*b*.

Signals I and I(bar) and Q and Q(bar) serve to drive inner MZ modulators 114 and 116 in a push-pull fashion, respectively. As such, electrodes 112-*c* and 112-*d* are driven $\pi$ out of phase with respect to one another. Likewise, electrodes 112-*g* and 112-*h* are also driven $\pi$ out of phase with respect to one another. Accordingly, relatively high voltages must be applied to maintain such a phase difference between the signals applied to the electrodes of the inner MZ modulators. These high voltages require higher power and render the conventional DQPSK modulator incompatible with lower power technologies, such as CMOS.

Moreover, although an excess voltage is applied in order to achieve the $\pi$-phase shift imposed by electrodes 112-*g* and 112-*h*, a portion of this phase shift is retracted by $\pi/2$ rotator 118. Accordingly, an additional voltage is applied through rotator 118 to remove part of the $\pi$-phase shift. Modulator 100 is thus inefficient in this respect.

It is accordingly a primary object of the invention to provide a modulator that has increased efficiency.

SUMMARY

Consistent with the present disclosure, an optical device is provided that includes a splitter having an input configured to receive a first optical signal, as well as first, second, and third outputs. The optical device further includes first, second, and third waveguides, each of which being coupled to a corresponding one of the first, second, and third outputs of the splitter. A coupler is also provided that has first, second, and third inputs, each of which being respectively coupled to the first, second, and third waveguides. In addition, the coupler further having an output. A first electrode is provided adjacent the first waveguide and is configured to modulate a refractive index of a portion of the first waveguide in accordance with first information associated with a first data stream. A second electrode provided adjacent the second waveguide and is configured to adjust a refractive index of a portion of the second waveguide. Further, a third electrode is provided adjacent the third waveguide. The third electrode is configured to modulate a refractive index of a portion of the third waveguide in accordance with second information associated with a second data stream, wherein the output of the coupler supplies a second optical signal carrying the first and second information.

Additional objects and advantages will be set forth in part in the description which follows, or may be learned by practice of the invention. The objects and advantages consistent with the present disclosure will be realized and attained by means of the elements and combinations particularly pointed out in the appended claims.

It is to be understood that both the foregoing general description and the following detailed description are exemplary and explanatory only and are not restrictive of the invention, as claimed.

The accompanying drawings, which are incorporated in and constitute a part of this specification, illustrate embodiments of the invention and together with the description, serve to explain the principles of the invention.

BRIEF DESCRIPTION OF THE DRAWINGS

FIGS. 3 and 4(*a*)-4(*d*) are constellation diagrams associated with the modulator shown in FIG. 2.

DESCRIPTION OF THE EMBODIMENTS

A phase modulator is disclosed that includes three arms between a splitter portion and a coupler portion. The splitter is configured such that equal amounts of optical power are supplied to each arm, and the phase of light in two of the arms is controlled, such that the light in the two arms destructively or constructively interferes with light in the third static arm. As a result, the net phase of the light output from the modulator is determined, at any given time, by the phase of light in the two signal driven arms. By appropriately selecting the phase relationship between the two data encoding arms and the remaining static arm, less voltage is required in order to generate shifts between differential quadrature constellation points than for a conventional set of 2 MZ pairs of modulators performing the same function. In particular, the modulator consistent with the present disclosure may require, at most, a $\pi/2$ phase shift between constellation points. Accordingly, the modulator is more efficient and consumes less power.

Reference will now be made in detail to exemplary embodiments of the disclosure. Wherever possible, the same reference numbers will be used throughout the drawings to refer to the same or like parts.

Figure 2:
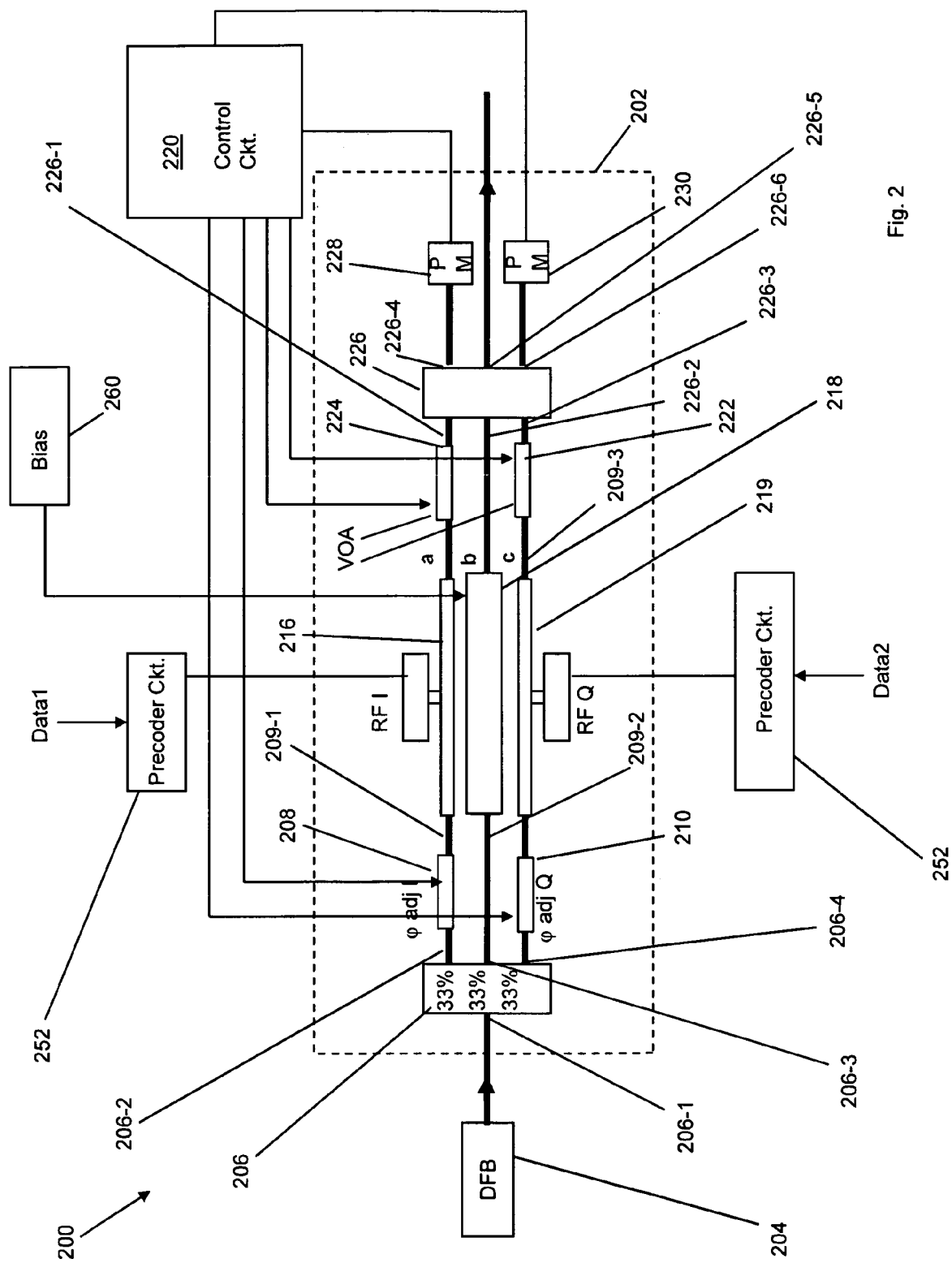
FIG. 2 is a block diagram of a modulator consistent with the present disclosure.
Figure 4A:
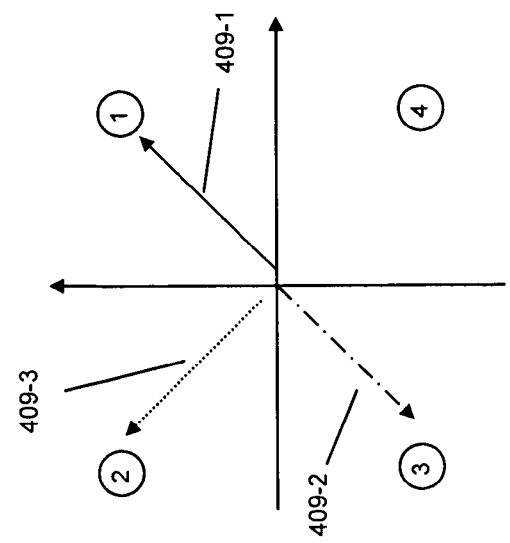
Figure 4B:
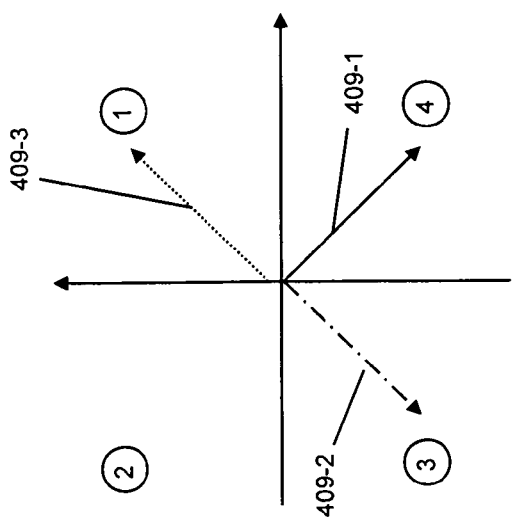
Figure 4C:
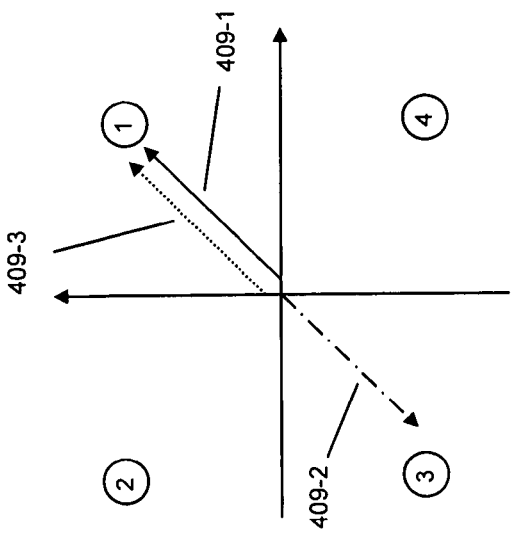
Figure 4D:
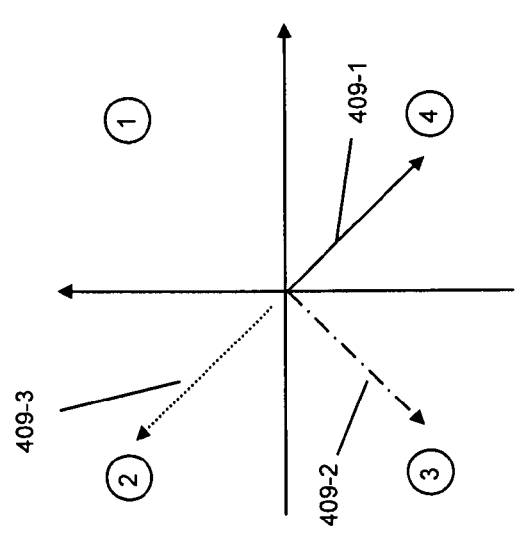

FIG. 2 illustrates a transmitter 200 including a relatively low power modulator 202 consistent with an aspect of the present disclosure. Transmitter 200 includes a distributed feedback (DFB) laser 204, which supplies a continuous wave (CW) output to 1×3 power splitter 206 of modulator 202. 1×3 power splitter 206 may include a multimode interference (MMI) coupler, a y-branch, star coupler or any combination of two or more of these components. Substantially a third of the incoming light supplied to input port 206-1 of 1×3 power splitter 206 is supplied at each of output ports 206-2 to 206-4. Light supplied from output port 206-2 is fed to waveguide or branch 209-1 and passes through phase adjuster 208, and variable optical attenuator (VOA) 222 to input port 226-1 of 3×3 power coupler 226. 3×3 power coupler 226 may also include one or more of an MMI coupler, y-branch, and star coupler.

Light supplied from output port 206-3 of 1×power coupler 206 passes though waveguide or branch 209-2 to input 226-2 of power coupler 226, and light supplied from output port 206-4 of power coupler 206 passes through phase adjuster 210 and VOA 224 to input port 226-3 of power coupler 226.

As further shown in FIG. 2, light supplied to the input ports of power coupler 226 is combined and then evenly power split between output ports 226-4 to 226-6, such that each outputs substantially ⅓ of the aggregate power received on inputs 226-1 to 226-3. In the event of a phase or power imbalance between the three arms 209-1 to 209-3, output port 226-4 or 226-6 supplies light to a photodiode or power monitor 228 or 230, respectively. Both power monitors 228 and 230 are coupled to a control circuit 220. In response to an output from power monitor 228 or 230, control circuit 220 supplies feedback control signals for adjusting the phase associated with phase adjusting circuits 208 and/or 210 and the attenuation (an thus the optical power of light traveling in a corresponding one of waveguides 209-1 and 209-3) associated with VOA 222 and/or 224. Output port 226-5 supplies an optical signal that is transmitted to a receiver (not shown in FIG. 2) located downstream from transmitter 200.

In addition, as shown in FIG. 2, electrodes RF I (216), Vb (218), and RF Q (219) are adjacent to branches or waveguides, 209-1, 209-2, and 209-3, respectively. First information associated with a first data stream, e.g., Data1 shown in FIG. 2, is supplied to a first circuit, such as precoder circuit 250, which encodes the data stream and supplies an encoded data stream to electrode 216, which, in turn, modulates the refractive index of a portion of branch 209-1 and thus the phase of light propagating therethrough. A bias voltage from a power supply circuit 260 is supplied to electrode 218, which adjusts the refractive index of a portion of branch 209-2, for example, such that the phase of light in branch 209-2 is at a substantially fixed value. Further, second information associated with an additional data stream e.g., Data2, may be supplied to a second circuit, such as precoder circuit 252, which encodes such data and supplies the additional encoded data steam to electrode 219. The refractive index of a portion of branch 209-3 is modulated in accordance with the additional encoded data to thereby modulate the phase of light traveling in branch 209-3. Accordingly, the encoded data stream (output from circuit 250), as well as the additional encoded data stream (output from circuit 252), act to change the phase of the light output from port 226-5. As a result of these phase changes, the optical signal output from transmitter 200 carries both the first and second information.

The operation of modulator 202 will next be described with reference to FIGS. 3 and 4(*a*) to 4(*b*). By way of background, a DQPSK modulator outputs a signal that is sinusoidal in form. The signal typically has one of four phases. These phases are represented by the constellation points 1, 2, 3, and 4 shown in the phasor diagram illustrated in FIG. 3. Namely, points 1, 2, 3, and 4 represent phases of $\pi/4$, $3\pi/4$, $5\pi/4$, and $7\pi/4$ of the signal, respectively. A clockwise change in phase of 90 degrees ($\pi/2$) between any two points in the constellation (i.e., a change in 90 degrees between any two of the signal phases) corresponds to a particular bit symbol, namely, 01. In addition, a change across the constellation, i.e. a change in phase of $\pi$ corresponds to transmission of bit symbol 11, a counter-clockwise change of 90 degrees ($\pi/2$) corresponds to transmission of the bit symbol 10, and no change in phase corresponds to transmission of the bit symbol 00.

As noted above, the voltages applied to each of electrodes 216, 218, and 219 impart a phase to the optical signal propagating in branches 209-1, 209-2, and 209-3, respectively.

FIGS. 4(*a*) to 4(*d*) show phase vectors associated each of each of these phases under different biasing conditions. In each of these figures, the phase vectors are superimposed on the constellation shown in FIG. 3. In FIG. 4(*a*), phase vectors 409-1, 409-2, and 409-3 are associated with phases of the optical signals traveling in branches 209-1, 209-2, and 209-3, respectively. By appropriately biasing, electrodes 216 and 219, the phases of the optical signals propagating in branches 209-1 and 209-3 may be adjusted such that when summed with the phase of light traveling in branch 209-3, the net phase is $\pi/4$. As shown graphically in FIG. 4(*a*), phase vector 409-2 (associated with branch 209-2) is cancelled by vector 409-1 (associated with branch 209-1). The net phase, therefore, namely, $\pi/4$ corresponds to constellation point 1 in FIG. 3. The phase vectors add in a similar fashion to obtain the remaining phases, corresponding to the points of the constellation shown in FIG. 3. In particular, in FIG. 4(*b*), the voltage on electrode 409-3 is changed such that the phase of light in branch 209-3 has a phase corresponding phase vector 409-3 ($3\pi/4$). Phase vectors 409-1 and 409-2 remain unchanged relative to FIG. 4(*a*), and, thus, vectors 409-1 and 409-2 cancel. Accordingly, the resulting phase of the output light is $3\pi/4$ (constellation point 2 in FIG. 3).

In FIG. 4(*c*), the phase of the optical signal in branch 209-1 is rotated clockwise by $\pi/2$ and the phase of the optical signal in branch 209-3 is rotated counterclockwise, also by $\pi/2$ (see relative positions of phase vectors 409-1 and 409-3). The phase vectors associated with these optical signals, therefore, cancel, and the net phase of the output optical signal is that of the optical signal carried in branch 209-2, namely $5\pi/4$, which corresponds to constellation point 3 in FIG. 3. Lastly, in FIG. 4(*d*), the phase of the optical signal in branch 209-1 is rotated clockwise by $\pi/2$, as represented by the rotation of phase vector 409-1 in this figure. Accordingly, vectors 409-2 and 409-3 cancel, and the net phase of the output signal is $7\pi/4$, which corresponds to constellation point 4 in FIG. 3.

By applying relatively low biases resulting in phase changes of $\pi/2$ (instead of $\pi$) in the optical signals traveling in branches 209-1 and 209-3, each of the phase states associated with the constellation points shown in FIG. 3 can be realized. Moreover, by appropriately changing these biases, corresponding changes in phase between these states can also be realized in order to transmit bit symbols 10, 11, 01, and 00, in accordance with the DQPSK format.

Table 1 below lists various combinations of optical signal phases in branches 209-1 to 209-3 and corresponding phase states of the constellation shown in FIG. 3. It is noted that these phase values are exemplary, and similar results can be obtained by adding a constant to each phase value. For example, $\pi/2$ may be added to each of the phase values listed in Table 1, which would result in the rotation of the constellation points by 90 degrees. DQPSK modulated signals may still be obtained by changing between the phases states represented by such a rotated constellation.

| Phase State | Branch 209-1 | Branch 209-2 | Branch 209-3 |
|---|---|---|---|
| 1 | $\pi/4$ | $5\pi/4$ | $\pi/4$ |
| 2 | $3\pi/4$ | $5\pi/4$ | $\pi/4$ |
| 3 | $3\pi/4$ | $5\pi/4$ | $7\pi/4$ |
| 4 | $\pi/4$ | $5\pi/4$ | $7\pi/4$ |

Returning to FIG. 2, in order to insure proper operation of modulator 202, the phases of the optical signals propagating in branches 209-1 and 209-3 must be controlled, and the intensities of these optical signals should be substantially identical. Accordingly, power monitors 228 and 230 to monitor the light propagating in these branches, as well as branch 209-2. The power monitors provide sense signals to control circuit 220, which, in turn supplies control signals to VOAs 222 and 224. In addition, when modulator 200 is first powered up, phase adjusters 208 and 210 may be adjusted under the control of control circuit 220 so that a default phase associated with branches 209-1 and 209-3 corresponds to phase vectors 409-1 and 409-3 shown in FIG. 4(a). Further phase adjustments may then be made in response to the sense signals received from power monitors 228 and 230.

Figure 1:
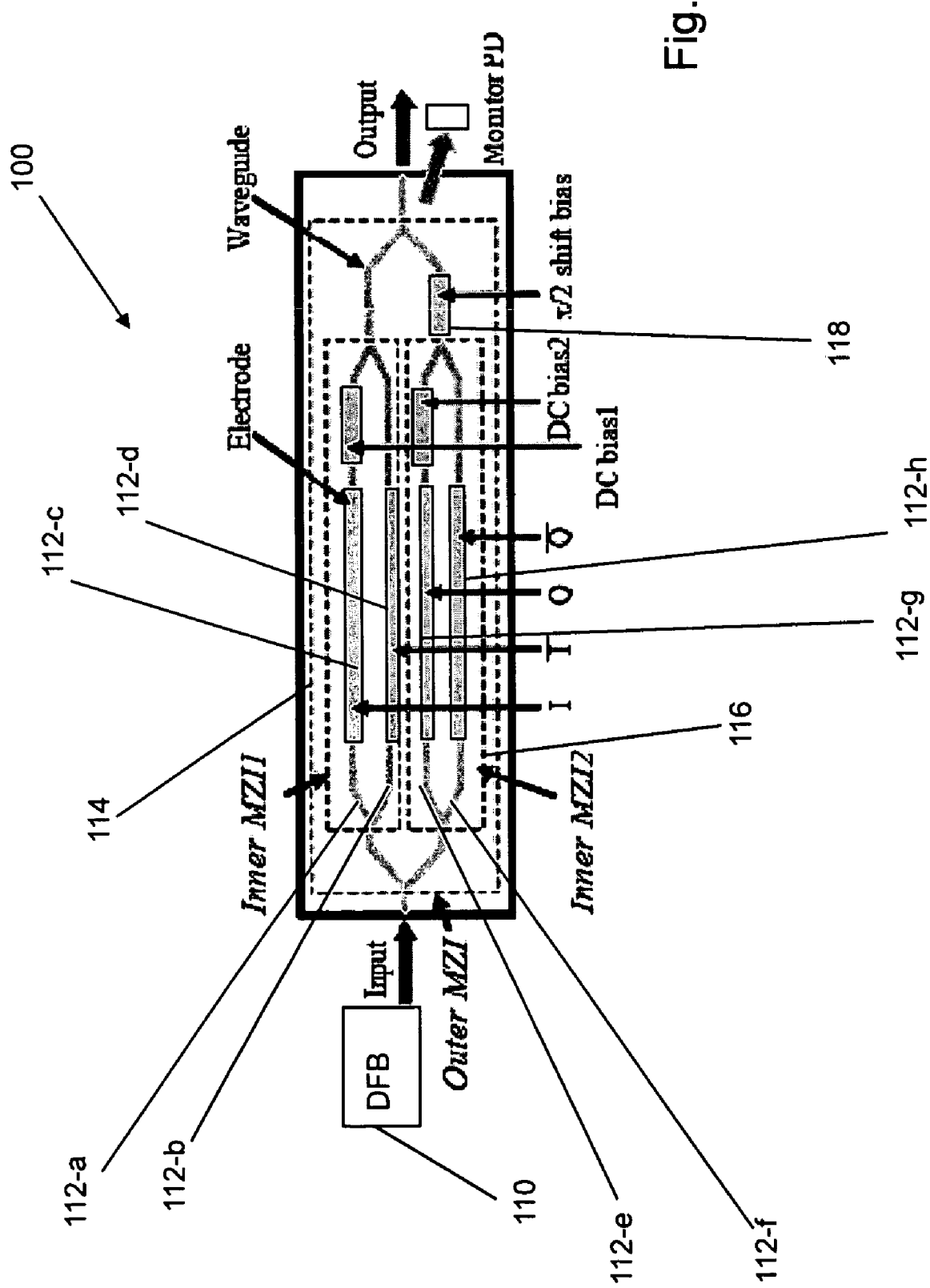
FIG. 1 is a block diagram of a conventional modulator.

In the conventional modulator discussed above in FIG. 1, in order to transition from phase state 1 to phase state 3 in FIG. 3, the phase of the optical signal output from inner MZ modulator 114 and the phase of optical signal output from the inner MZ modulator 116 must be shifted by $\pi$. In contrast, in modulator 200, the phase of light in branch 209-1 and the phase of light in branch 209-3 need only be shifted by $\pi/2$. That is, phase vector 409-1 is rotated $\pi/2$ clockwise and phase vector 409-3 is rotated $\pi/2$ counterclockwise, which requires substantially less energy than a rotation of $\pi$. Thus, a modulator consistent with the present disclosure can generate DQPSK signals with substantially less power than a conventional DQPSK modulator. For example, the power requirements associated with a modulator consistent with the present disclosure may be compatible with complementary metal-oxide-semiconductor (CMOS) circuits, such that conventional CMOS power supplies and circuitry can be integrated with the modulator on a common semiconductor substrate.

Figure 5:
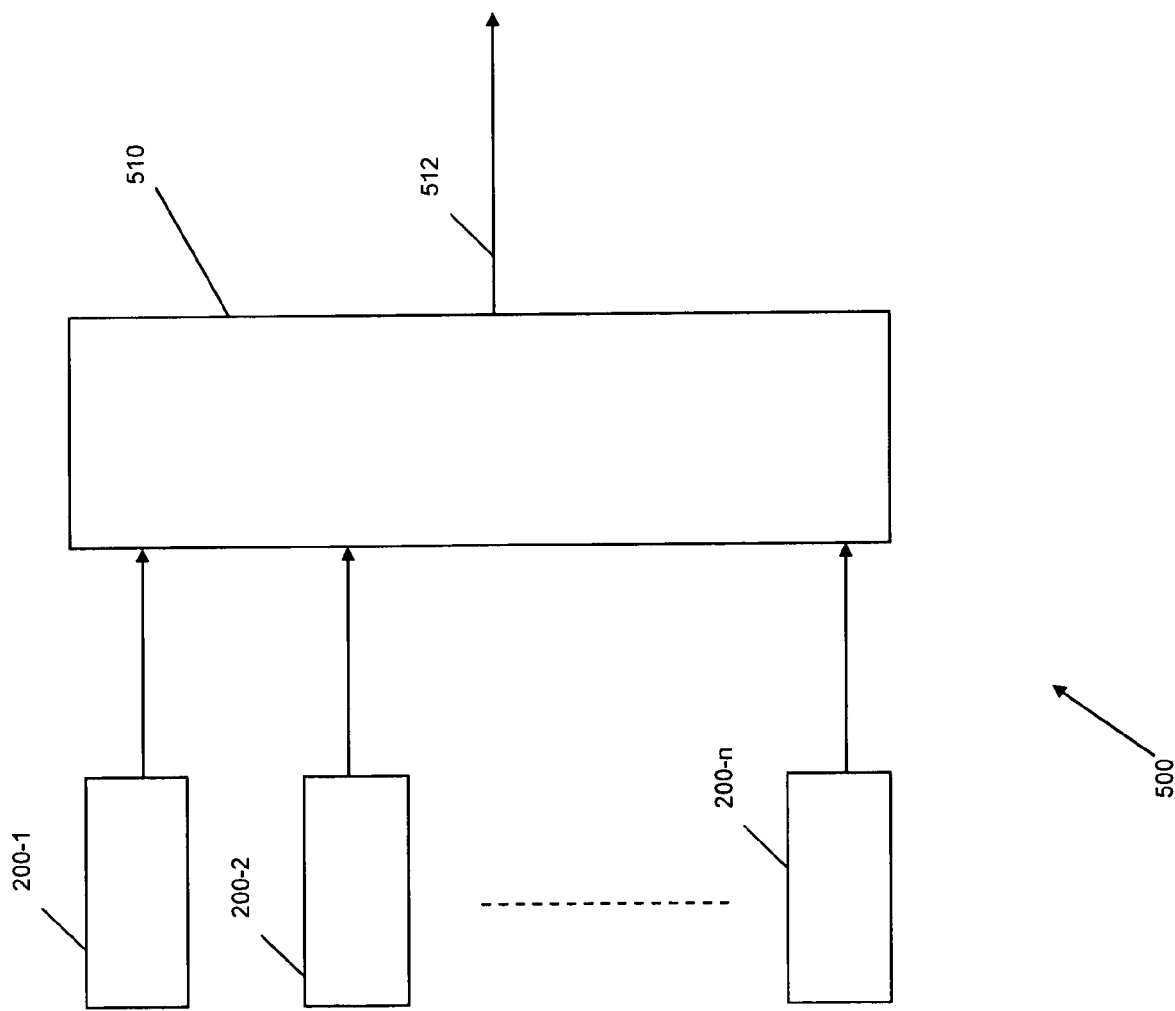
FIG. 5 illustrates a wavelength division multiplexed (WDM) system consistent with the present disclosure.

FIG. 5 illustrates an exemplary wavelength division multiplexed system 500 including a plurality of transmitters 200-1 to 200-n supplying corresponding optical signals to a wavelength division multiplexer 510. Each of transmitters 200-1 to 200-n has a similar structure as transmitter 200. The DFB laser in each of transmitters 200-1 to 200-n, however, outputs light at a different wavelength. The optical signals output from transmitters 200-1 to 200-n are combined onto a single optical communication path 512, including an optical fiber, for example.

Figure 6:
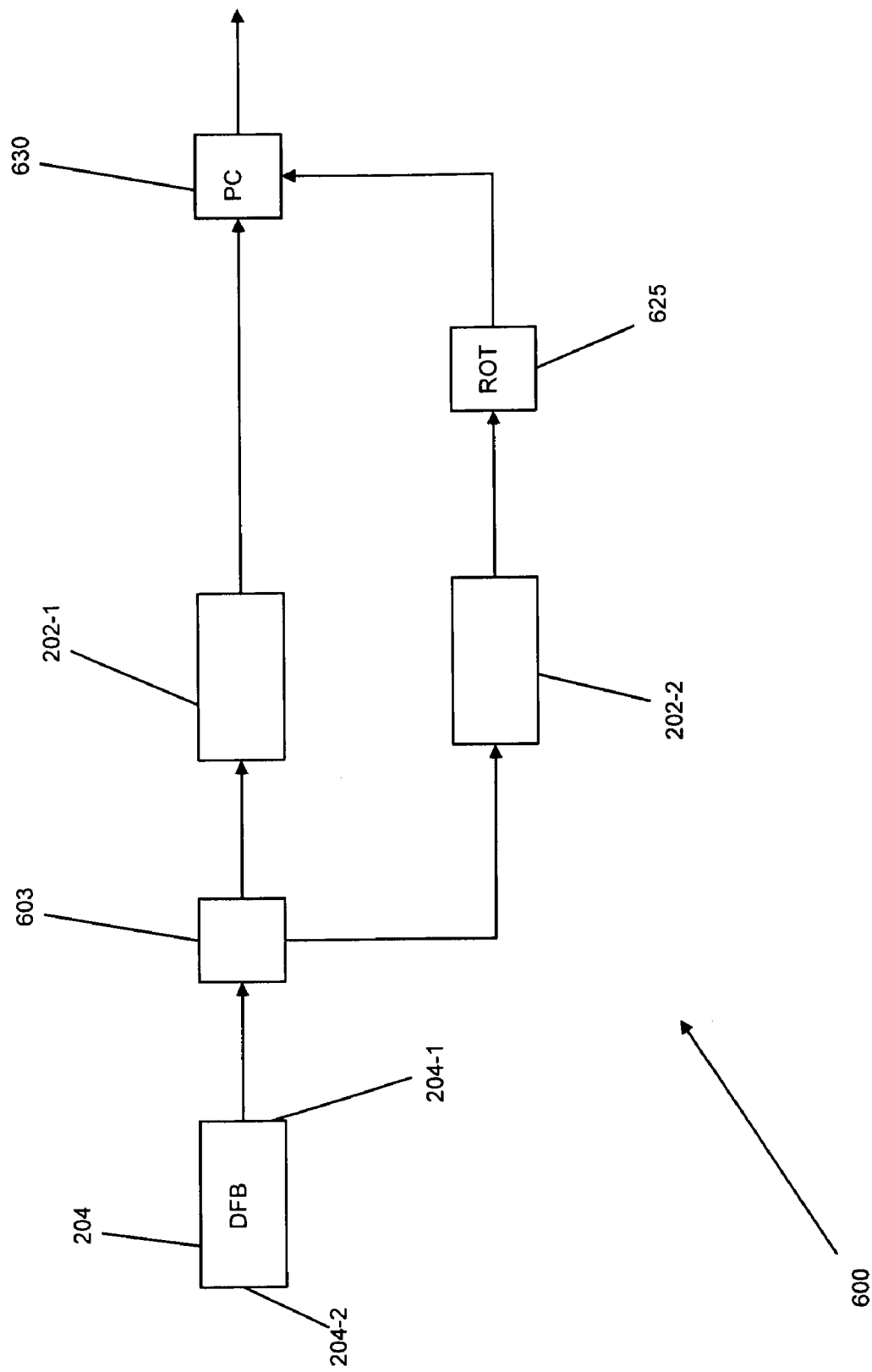
FIG. 6 illustrates a transmitter consistent with an additional aspect of the present disclosure.

FIG. 6 illustrates transmitter 600 consistent with another aspect of the present disclosure. Transmitter 600 includes DFB laser 204, which supplies light to a splitter 603, such as a 3 dB coupler. Splitter 603 supplies a first potion of the received light from DFB laser 204 to first modulators 202-1 and a second portion to second modulator 202-2. The first and second portions of light output from splitter 603 typically have substantially equal intensities.

As further shown in FIG. 6, data streams (not shown) are fed to respective circuits (not shown), which encode the received data in a similar fashion as circuits 250 and 252 discussed above with reference to FIG. 2. Each of such circuits supply corresponding encoded data outputs to modulator 202-1. Likewise, data streams (not shown) are fed to a circuit (not shown), which, in turn, supplies corresponding data streams to modulators 202-2. Modulators 202-1 and 202-2 have a similar structure as modulator 200 shown in FIG. 2, and both serve to generate DQPSK-modulated signals in manner similar to that described above. The polarization of light output from modulator 202-2, however, is rotated by polarization rotator circuit 625 so that modulated optical signals output from modulator 202-2 have a different polarization than modulated signals output from modulator 202-1. These two outputs are then combined by a polarization beam combiner, such as polarization combiner circuit 630, and then output to a downstream receiver.

Consistent with a further aspect of the present disclosure, 3 dB coupler 603 may be omitted. In that case, light output from the front facet 204-1 of DFB laser 204 may be supplied to modulator 202-1 and light output from the back facet 204-2 of DFB laser 202-2 may be supplied to modulator 202-2.

It is understood that each of the transmitters shown in FIG. 5 may be replaced with the transmitter shown in FIG. 6. It is noted, however, that each DFB laser in the transmitters outputs light at a different wavelength. A WDM system including transmitters having the structure shown in FIG. 6 will have increased capacity, typically by a factor of two.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. An optical transmitter, comprising:
a laser configured to supply a first optical signal;
a first splitter configured to supply a first portion of the optical signal and a second portion of the optical signal;
a first modulator configured to receive the first portion of the optical signal;
a second modulator configured to receive the second portion of the optical signal, the first modulator including:
a second splitter having an input configured to receive the first portion of the optical signal, and first, second, and third outputs,
first, second, and third waveguides, each of which being coupled to a corresponding one of the first, second, and third outputs of the second splitter the second splitter being configured to supply a substantially equal amount of optical power to each of the first, second, and third waveguides;
a coupler having first, second, and third inputs, each of which being coupled to the first, second, and third waveguides, respectively, the coupler further having an output;
a first electrode provided adjacent the first waveguide, the first electrode being configured to modulate a refractive index of a portion of the first waveguide in accordance with first information associated with a first data stream;
a second electrode provided adjacent the second waveguide, the second electrode being configured to adjust a refractive index of a portion of the second waveguide;
a third electrode provided adjacent the third waveguide, the third electrode being configured to modulate a refractive index of a portion of the third waveguide in accordance with a second information associated with a second data stream,
wherein the output of the coupler supplies a second optical signal carrying the first and second information.

2. An optical transmitter in accordance with claim 1, wherein the coupler is a first coupler, the second modulator includes:
- a third splitter having an input configured to receive the second portion of the optical signal, and first, second, and third outputs,
- first, second, and third waveguides, each of which being coupled to a corresponding one of the first, second, and third outputs of the third splitter;
- a second coupler having first, second, and third inputs, each of which being respectively coupled to the first, second, and third waveguides of the second modulator, the coupler further having an output;
- a fourth electrode provided adjacent the first waveguide of the second modulator, the fourth electrode being configured to modulate a refractive index of a portion of the first waveguide of the second modulator in accordance with third information associated with a third data stream;
- a fifth electrode provided adjacent the second waveguide of the second modulator, the fifth electrode being configured to adjust a refractive index of a portion of the second waveguide of the second modulator;
- a sixth electrode provided adjacent the third waveguide of the second modulator, the sixth electrode being configured to modulate a refractive index of a portion of the third waveguide of the second modulator in accordance with a fourth information associated with a fourth data stream,
- wherein the output of the second coupler supplies a third optical signal carrying the third and fourth information.

3. An optical transmitter in accordance with claim 1, wherein the laser is a distributed feedback (DFB) laser.

4. An optical transmitter in accordance with claim 3, wherein the first optical signal is a continuous wave (CW) optical signal.

5. An optical transmitter in accordance with claim 1, wherein the second optical signal is complies with a different quadrature phase shift keying format.

6. An optical transmitter in accordance with claim 1, wherein the output of the coupler is a first output, the coupler further including second and third outputs, the optical device further including:
- a first photodiode coupled to the first output; and
- a second photodiode coupled to the second output.

7. An optical transmitter in accordance with claim 1, further including:
- first and second photodiodes;
- a control circuit configured to receive outputs from the first and second photodiodes and supply first and second outputs;
- a first phase adjusting circuit coupled to the first waveguide, the first phase adjusting circuit being configured to adjust a phase of light in the first waveguide in response to the first output from the control circuit; and
- a second phase adjusting circuit coupled to the second waveguide, the second phase adjusting circuit being configured to adjust a phase of light in the second waveguide in response to the second output from the control circuit.

8. An optical transmitter in accordance with claim 1, further including:
- first and second photodiodes;
- a control circuit configured to receive outputs from the first and second photodiodes and supply first and second outputs;
- a first variable optical attenuator coupled to the first waveguide, the first variable optical attenuator being configured to adjust an optical power of light in the first waveguide in response to the first output from the control circuit; and
- a second variable optical attenuator coupled to the second waveguide, the second variable optical attenuator being configured to adjust an optical power of light in the second waveguide in response to the second output from the control circuit.

9. An optical transmitter in accordance with claim 1, further including:
- first and second photodiodes;
- a control circuit configured to receive outputs from the first and second photodiodes and supply first and second outputs;
- a first variable optical attenuator coupled to the first waveguide, the first variable optical attenuator being configured to adjust an optical power of light in the first waveguide in response to the first output from the control circuit; and
- a second variable optical attenuator coupled to the second waveguide, the second variable optical attenuator being configured to adjust an optical power of light in the second waveguide in response to the second output from the control circuit.

10. A wavelength division multiplexed optical communication system, comprising:
- a plurality of transmitters; and
- a wavelength division multiplexer coupled to the plurality of transmitters, one of the plurality of transmitters including:
- a laser configured to supply a first optical signal;
- a first splitter configured to supply a first portion of the optical signal and a second portion of the optical signal;
- a first modulator configured to receive the first portion of the optical signal;
- a second modulator configured to receive the second portion of the optical signal, the first modulator including:
  - a second splitter having an input configured to receive the first portion of the optical signal, and first, second, and third outputs,
  - first, second, and third waveguides, each of which being coupled to a corresponding one of the first, second, and third outputs of the second splitter, the second splitter being configured to supply a substantially equal amount of optical power to each of the first, second, and third waveguides;
  - a coupler having first, second, and third inputs, each of which being coupled to the first, second, and third waveguides, respectively, the coupler further having an output;
  - a first electrode provided adjacent the first waveguide, the first electrode being configured to modulate a refractive index of a portion of the first waveguide in accordance with first information associated with a first data stream;
  - a second electrode provided adjacent the second waveguide, the second electrode being configured to adjust a refractive index of a portion of the second waveguide;
  - a third electrode provided adjacent the third waveguide, the third electrode being configured to modulate a refractive index of a portion of the third waveguide in accordance with a second information associated with a second data stream, wherein the output of the coupler supplies a second optical signal carrying the first and second information.

11. A wavelength division multiplexed optical communication system in accordance with claim 10, wherein the coupler is a first coupler, the second modulator includes:
a third splitter having an input configured to receive the second portion of the optical signal, and first, second, and third outputs,
first, second, and third waveguides, each of which being coupled to a corresponding one of the first, second, and third outputs of the third splitter;
a second coupler having first, second, and third inputs, each of which being respectively coupled to the first, second, and third waveguides of the second modulator, the coupler further having an output;
a fourth electrode provided adjacent the first waveguide of the second modulator, the fourth electrode being configured to modulate a refractive index of a portion of the first waveguide of the second modulator in accordance with third information associated with a third data stream;
a fifth electrode provided adjacent the second waveguide of the second modulator, the fifth electrode being configured to adjust a refractive index of a portion of the second waveguide of the second modulator;
a sixth electrode provided adjacent the third waveguide of the second modulator, the sixth electrode being configured to modulate a refractive index of a portion of the third waveguide of the second modulator in accordance with a fourth information associated with a fourth data stream,
wherein the output of the second coupler supplies a third optical signal carrying the third and fourth information.

12. A wavelength division multiplexed optical communication system in accordance with claim 10, wherein the laser is a distributed feedback (DFB) laser.

13. A wavelength division multiplexed optical communication system in accordance with claim 12, wherein the first optical signal is a continuous wave (CW) optical signal.

14. A wavelength division multiplexed optical communication system in accordance with claim 10, wherein the second optical signal complies with a differential quadrature phase shift keying format.

15. A wavelength division multiplexed optical communication system in accordance with claim 10, wherein the output of the coupler is a first output, the coupler further including second and third outputs, the optical device further including:
a first photodiode coupled to the first output; and
a second photodiode coupled to the second output.

16. A wavelength division multiplexed optical communication system in accordance with claim 10, further including:
first and second photodiodes;
a control circuit configured to receive outputs from the first and second photodiodes and supply first and second outputs;
a first phase adjusting circuit coupled to the first waveguide, the first phase adjusting circuit being configured to adjust a phase of light in the first waveguide in response to the first output from the control circuit; and
a second phase adjusting circuit coupled to the second waveguide, the second phase adjusting circuit being configured to adjust a phase of light in the second waveguide in response to the second output from the control circuit.

17. A wavelength division multiplexed optical communication system in accordance with claim 10, further including:
first and second photodiodes;
a control circuit configured to receive outputs from the first and second photodiodes and supply first and second outputs;
a first variable optical attenuator coupled to the first waveguide, the first variable optical attenuator being configured to adjust an optical power of light in the first waveguide in response to the first output from the control circuit; and
a second variable optical attenuator coupled to the second waveguide, the second variable optical attenuator being configured to adjust an optical power of light in the second waveguide in response to the second output from the control circuit.

18. A wavelength division multiplexed optical communication system in accordance with claim 11, further including:
an optical rotator circuit configured to receive the third optical signal and supply a polarization rotated third optical signal; and
a polarization combiner circuit configured to combine the polarization rotated third optical signal and the second optical signal.

* * * * *